May 10, 1938.  E. L. ANDERSON  2,117,051
PRINTING FRAME
Filed May 14, 1937  2 Sheets-Sheet 1
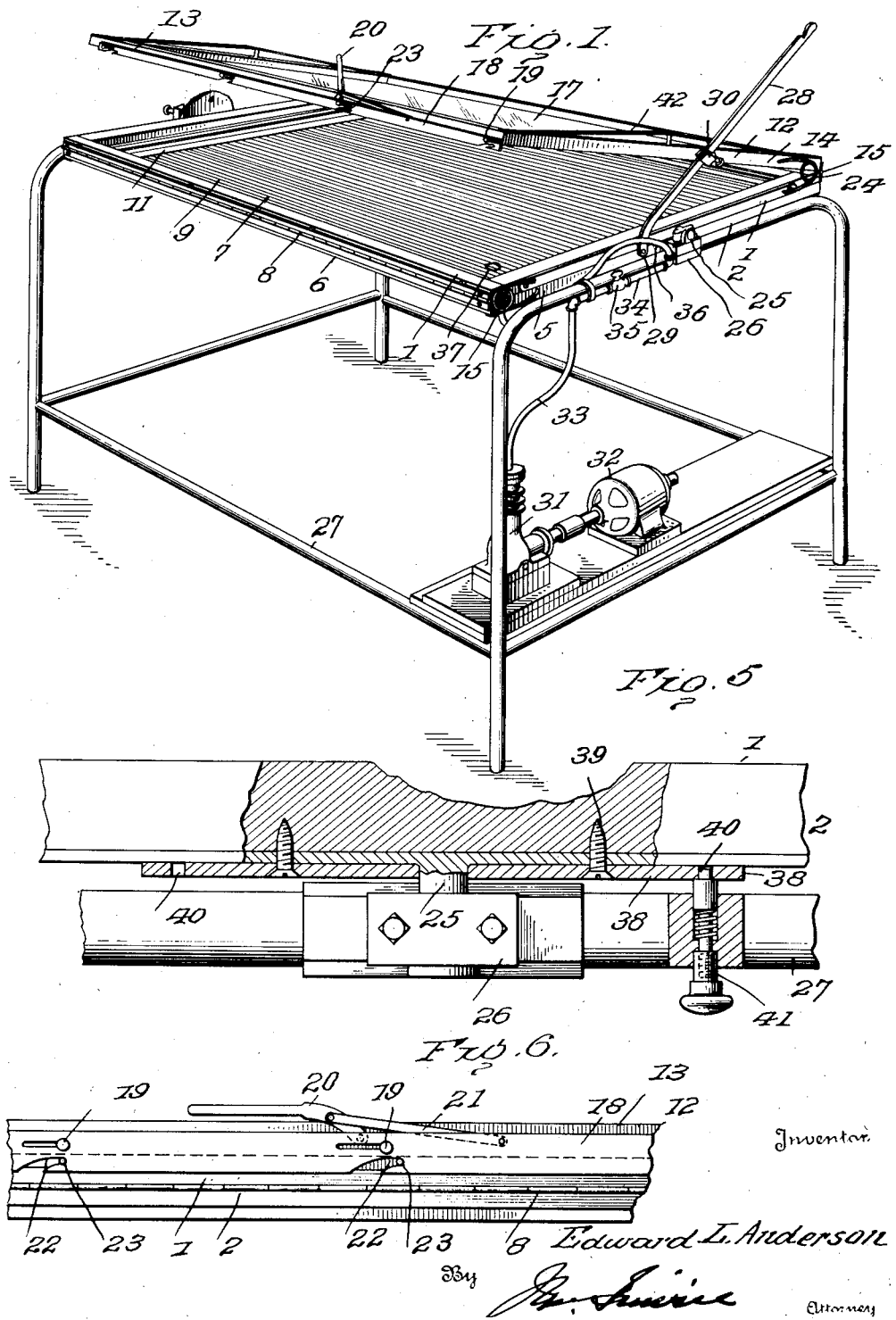

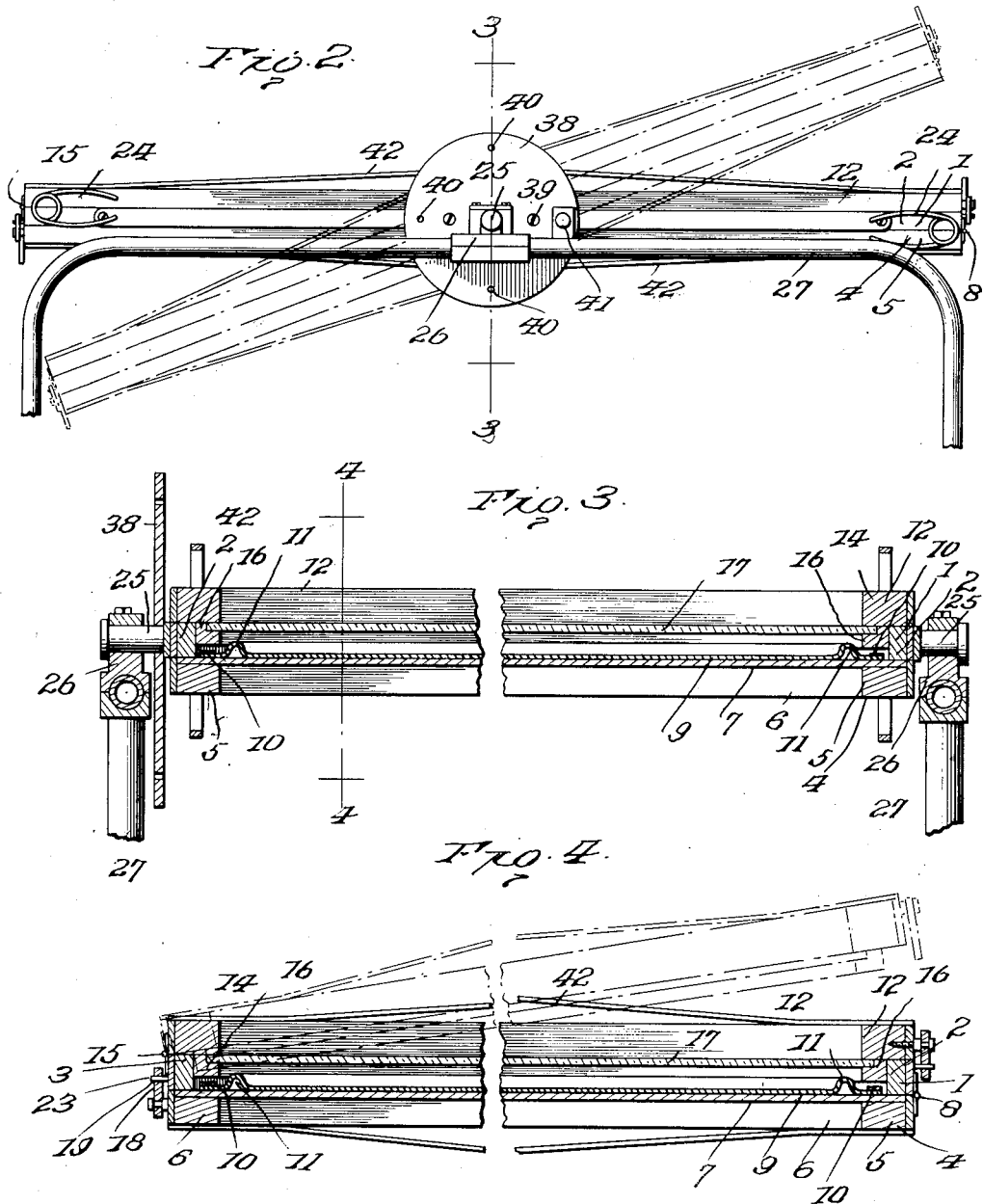

Patented May 10, 1938

2,117,051

UNITED STATES PATENT OFFICE 2,117,051

PRINTING FRAME

Edward L. Anderson, Washington, D. C., assignor of one-half to Edwin H. Walker, Washington, D. C.

Application May 14, 1937, Serial No. 142,691

10 Claims. (Cl. 95—76)

This invention is directed to a printing frame designed more particularly for use in the photo-mechanical art, wherein the frame is constructed to effectively replace the two independent framing structures heretofore necessary for use in accomplishing the purpose.

In the photo-mechanical art particularly, it is at times necessary to load the negative and sensitive plate to be effected differently with respect to the glass through which the exposure is made. In some instances, particularly where the material on a glass negative is being reproduced on a sensitive plate, it is necessary to place the plate in position in the frame first and then properly apply the glass negative, because under these circumstances the negative being transparent, permits the operator to directly determine the correct position of the negative on the sensitized plate. As under these circumstances the sensitized plate is placed in position first and the glass negative next, it is apparent that the frame must contain an element, ordinarily termed a blanket, on which the plate is deposited, the glass negative positioned and the glass frame clamped on the negative for exposure. In other instances, it is readily possible and desirable to load on the glass plate. Recognizing the necessity for these distinctive associations in carrying out the procedure of this art, there have been heretofore provided two independent frames, in one of which the loading must take place on the blanket and in the other of which the loading must take place on the glass. As these frames are comparatively large and heavy, they occupy considerable floor space, to say nothing of the doubling of expense in providing two frames.

The primary object of the present invention, therefore, is to provide a single frame mounted for such movement and control that the loading may take place on either the blanket or the glass at will, with the further provision that the frame is mounted so that it may be swung to a position to permit loading on the blanket or on the glass at will without the necessity of the operator changing his position. The improved frame comprises a supporting frame mounted for swinging on a base frame, together with a blanket frame hingedly connected to one edge of the supporting frame and a glass frame hingedly connected to the opposite end of the supporting frame. Thus the printing frame as a whole may be swung on its axis in the base frame to arrange either the blanket frame or glass frame in the lowermost position. Whichever of these frames is lowermost, the other of such frames may be swung upwardly on its hinged connection with the supporting frame and expose the inner surface of the lowermost frame for loading. Incident to the hinged relation of the respective frames, the edge of the frame to be raised, in either position of the printing frame as a whole, faces in the same direction. Thus, the operator may carry out the complete operation without changing his position with respect to the printing frame.

The invention is illustrated in the accompanying drawings, in which:

Figure 1 is a perspective view of the printing frame as a whole, the glass frame being shown elevated or open.

Figure 2 is a broken end elevation showing the printing frame in horizontal or loading position, the capability of the printing frame for movement on its axis to move the frame into exposure position being shown in dotted lines.

Figure 3 is a section on the line 3—3 of Figure 2.

Figure 4 is a section on the line 4—4 of Figure 3.

Figure 5 is an enlarged view in elevation, partly in section, showing more particularly the means for holding the frame in either loaded or exposure position.

Figure 6 is a broken front elevation showing the means for clamping the frames to insure an air-tight relation between the blanket and glass.

The improved printing frame comprises an intermediate or supporting frame 1, which is preferably of rectangular outline, including side bars 2 and end bars 3, the space within which is completely uninterrupted. A blanket frame 4, commensurate in size with that of the supporting frame and including end bars 5 and side bars 6, has a section 7 preferably of wood or the like closing that surface of the frame 4 next the supporting frame. The supporting frame as a whole, the framing bars of which are preferably thicker than the similar bars of the supporting frame, is hingedly connected at 8 to one end of the supporting frame.

An element indicated at 9, and hereinafter referred to as the blanket, overlies the closure 7 of the blanket frame and is secured by strips 10 along its edges to the frame bars 5 and 6. This blanket, preferably a rubber section of appropriate thickness, is formed adjacent each edge with an upstanding rib 11 of hollow formation which constitutes a sealing element, as hereinafter described.

A glass frame 12, including side bars 13 and end bars 14 commensurate in size with that of the blanket frame, is hingedly connected at 15 to the supporting frame. It is to be noted that the hinged connection 8 of the blanket frame and the hinged connection 15 of the glass frame are at the opposite sides or ends of the supporting frame, so that these respective blanket and glass frames open in opposite directions relative to the supporting frame.

The framing bars 13 and 14 of the glass frame are rabbeted on their edges next the supporting frame, providing projections 16 which fit snugly within the framing bars of the supporting frame when the glass frame is in lowered or operative position. A glass plate 17 is secured in these projecting portions 16 of the framing bars 13 and 14 of the glass frame and receiving ribs 11 on the blanket are arranged to engage the glass plate when the frames are closed.

In order to insure a desired sealing relation between the blanket and glass plate, means are provided whereby the frames may be clamped together when in operative position. This means includes a plate 18 slidably supported through pin and slot connections 19 on the end bar 14 of the glass frame opposite the hinged connection 15. A manually operable lever 20 and a link connection 21 between the lever and plate moves the plate in either direction.

The lower edge of the plate is formed with a reentrant slot 22 with an upwardly inclined lower edge designed to cooperate with a pin 23 on the supporting frame. It is preferred that several clamping slots and pins 22 and 23 be provided lengthwise the plate 18 and frame bars of the supporting frame to insure accurate clamping. An identically similar clamping means is provided on the free frame bar of the blanket frame opposite the hinge 8. Thus, either or both the blanket frame or glass frame may be clamped to the supporting frame, permitting both to be secured to the supporting frame during the exposure use of the printing frame or either freed from the supporting frame to be raised for loading purposes, as will later appear.

Compensating springs 24 are mounted on the respective frames adjacent the hinged ends thereof to compensate for the weight of the frames during their necessary raising and lowering in operation. Of course, any desired type of compensating means, such as outstanding weights, pulleys and weights, or any other conventional means not necessary to show or describe may be used if desired.

The supporting frame is provided in its axial center transverse the opening direction of the blanket and glass frames with outstanding spindles 25 mounted in appropriate bearings 26 carried by a base frame 27, thereby providing for a complete, uninterrupted swinging movement of the printing frame and the base frame.

The base frame is unimportant, so long as it maintains the printing frame at sufficient elevation to permit the necessary swinging movement. It is preferred, however, that the base frame be of skeleton form and as light as possible necessary for the requisite strength and stability.

An arm 28 is swingingly connected at 29 to the blanket frame and moves through a slide 30 on the glass frame, the arm being notched and the slide being arranged to cooperate with any of said notches to hold either the blanket frame or glass frame at the desired elevation when open.

It will, of course, be appreciated that, as is customary with frames of this type, means are provided for clamping the negative and plate being exposed between the blanket and glass. Ordinarily this is done by suction means and such is conventionally illustrated as an air pump 31 of any desired or appropriate type, a motor 32 for operating the pump, an air conduit 33 leading from the pump and preferably having a section 34 which contains a control valve 35 secured to one of the bars of the base frame in a position convenient to the operator. The conduit continues beyond the fixed section in the form of a flexible hose 36 which is led into the blanket frame through the closure 7 and opens between the blanket and closure. The blanket is provided with an opening 37 through which, under the suction of the pump, air may be drawn from between the blanket and glass.

The printing frame as a whole is arranged in a horizontal position for loading purposes and in a vertical position for exposure purposes. To insure that the frame as a whole is rigid in either of these positions at the will of the operator, a disk 38 is arranged concentric with one of the spindles 25 and secured at 39 to the bar of the supporting frame 1. The disk is formed with openings 40 to receive a spring-pressed pin 41 which, of course, may be withdrawn at will by the operator. The openings 40 are arranged so that the frame may be held in a horizontal position with either the blanket or glass frame uppermost for loading purposes and in a vertical position for exposure purposes in a substantially rigid, immovable manner.

It is to be particularly noted that the printing frame as a whole carries what have been termed a glass frame and a blanket frame and that these respective frames are hinged at opposite ends and on opposite surfaces of the supporting frame. Thus, with the printing frame arranged so that the glass frame is uppermost, such glass frame may be raised from what will be termed the front of the apparatus and when the printing frame as a whole has been swung to arrange the blanket frame uppermost, such blanket frame is also capable of being raised at the same end and from the same position as was the glass frame. Thus, the operator, without changing his position and merely by swinging the frame, may arrange either the glass frame or blanket frame uppermost.

Where it is desired to load on the blanket, the printing frame is swung and locked in a horizontal position with the glass frame uppermost. The glass frame is raised, held in raised position by the arm 28 and slide 30, a sensitized plate arranged on the blanket and a glass negative arranged on the plate. In this manner of loading, the transparency of the glass negative permits it to be conveniently and readily positioned on the blanket. The glass frame is lowered, the clamping lever 20 operated to clamp the glass frame to the supporting frame and insure substantial sealing relation between the sealing ribs 11 of the blanket and the glass. The motor is then energized, the valve 35 is opened and suction of the pump, finding its way through the outlet 37, withdraws the air from between the blanket and glass, causing the blanket to move toward the glass with the effect to bind the negative and sensitized plate firmly in position. The pin 41 is withdrawn from the particular opening 40 in the disk 38, the printing frame is swung into a vertical position and the exposure made through the glass frame, usually by an electric arc light.

Where the loading is to take place on the glass, the printing frame as a whole is swung until the blanket frame is uppermost, the clamping lever 20 for this blanket frame is operated to release the frame, and the blanket frame is swung upwardly, being held in elevated position by the slide 30 in cooperation with the notch in the arm 28. After placing the negative and sensitized plate in position on the glass, which of course is exposed when the blanket frame is raised, the blanket frame is lowered, clamped in position, the pin 41 releasing the lock of the printing frame, and the printing frame is swung to again expose through the glass, the frame as a whole being, of course, locked in the exposure position, as before.

From the above, it will be apparent that the present invention provides a printing frame possessing all the characteristics and capabilities of the two complete frames heretofore provided for this purpose. By the improved frame, loading on the blanket or loading on the glass may be readily and conveniently accomplished in the single framing structure, and in this duplex operation it is to be particularly noted that the movable frame, that is the frame which is raised for loading purposes, is, when in position to be operated, raised from the same identical position, so that the operator does not have to change his position to load on the respective frames and may perform the entire operation from what may be termed the front of the frame, that is positioning and locking the frame with the desired blanket or glass frame uppermost, raising the uppermost frame, loading the printing frame, lowering and clamping the raised frame, creating the necessary suction to hold the negative and exposure plate in position, unlocking the printing frame, swinging it to a vertical or exposure position and relocking the frame. This capability of the improved frame is not only an advantage in saving the time and labor of the operator but has another distinct advantage in that the frame as a whole may be placed practically against the wall or even in a corner of the shop, requiring only sufficient room at the rear or sides to insure proper swinging movement of the printing frame. This provides for a desired and highly important saving in space over that required for the two frames heretofore considered necessary for the function and further enables the operator to work from a single arc lamp, usually a heavy structure, without moving the same from frame to frame or from side to side of such frames.

Of course, it is to be understood that, aside from the specific materials hereinbefore referred to, the various parts may be constructed of any desired or appropriate material having sufficient strength, though it is a desired characteristic that the parts be constructed as light as possible consistent with proper function. Where the various framing parts are of wood, it may be preferred to brace such parts by conventional struts indicated at 42 in order to insure necessary rigidity of the framing parts.

What is claimed to be new is:

1. A base, a printing frame carried by the base, said printing frame including a supporting frame, a blanket frame, and a glass frame, the supporting frame being mounted for bodily rotatable movement on the base and on substantially the longitudinal median line of said supporting frame, the blanket frame and glass frame being respectively hinged in parallelism with the axis of rotation of the supporting frame and at relatively opposite sides of the supporting frame, the blanket frame and glass frame being free of the supporting frame except at their hinged connections and being movable respectively in relation to opposite faces of the supporting frame.

2. A base, a printing frame carried by the base, said printing frame including a supporting frame, a blanket frame, and a glass frame, the supporting frame being mounted for bodily rotatable movement with respect to the base, with the mounting in the plane of the supporting frame and on substantially the longitudinal median line of that frame, the blanket frame and glass frame being hinged to the supporting frame at relatively opposite sides of the supporting frame in substantial parallelism to its axis of rotation, the blanket frame and glass frame being hinged on opposite faces of the supporting frame, the rotation of the supporting frame on its mounting arranging either the blanket frame or glass frame uppermost, with either the blanket frame or glass frame, when uppermost, capable of being arranged on its hinged connection with the supporting frame from the same determinate position with respect to the supporting frame.

3. A base, a printing frame mounted in the base, said printing frame including a supporting frame, a blanket frame, and a glass frame, the supporting frame being mounted for rotation in the base on an axis substantially in the longitudinal median line of the frame, the blanket frame and glass frame being respectively hinged to the supporting frame at opposite sides of such supporting frame and on opposite faces of such frame, a blanket carried in the blanket frame, a glass in the glass frame, and clamping means to secure sealing cooperation between the edges of the blanket and the glass when the blanket frame and glass frame are in close relation to the supporting frame.

4. A base, a printing frame mounted in the base, said printing frame including a supporting frame, a blanket frame, and a glass frame, the supporting frame being mounted for rotation in the base on an axis substantially in the longitudinal median line of the frame, the blanket frame and glass frame being respectively hinged to the supporting frame at opposite sides of such supporting frame and on opposite faces of such frame, a blanket carried in the blanket frame, a glass in the glass frame, and clamping means to secure sealing cooperation between the edges of the blanket and the glass when the blanket frame and glass frame are in close relation to the supporting frame, and means for withdrawing air from between the blanket and glass.

5. A base, a printing frame mounted in the base, said printing frame including a supporting frame, a blanket frame, and a glass frame, the supporting frame being mounted for rotation in the base on an axis substantially in the longitudinal median line of the frame, the blanket frame and glass frame being respectively hinged to the supporting frame at opposite sides of such supporting frame and on opposite faces of such frame, a blanket carried in the blanket frame, a glass in the glass frame, and clamping means to secure sealing cooperation between the edges of the blanket and the glass when the blanket frame and glass frame are in close relation to the supporting frame, and means for securing the printing frame in any one of several predetermined positions with relation to the base.

6. A printing frame including a rectangular supporting frame, a base frame in which the supporting frame is mounted for rotation on substantially the longitudinal median line of the supporting frame, a blanket frame hinged to one edge of the supporting frame, a blanket in said frame, a glass frame hinged to the opposite edge of the supporting frame, a glass in the glass frame, a bead on the blanket for sealing cooperation with the glass in the glass frame when the frames are in closed relation, and clamping means to secure the glass frame and blanket frame in clamping relation with the supporting frame and with each other.

7. A construction as defined in claim 6, including a disk fixed to the supporting frame concentric with the axis and formed with openings, and a pin carried by the base frame and cooperating with any one of said openings to hold the printing frame in predetermined relation to the base frame.

8. A construction as defined in claim 6, including means for withdrawing air from between the blanket and glass.

9. A construction as defined in claim 6, wherein the clamping means includes a plate slidably mounted with respect to the frame to be clamped, a lever for sliding the plate, and inclined slots in the plate cooperating with pins carried by the supporting frame to provide clamping cooperation in the movement of the lever in one direction.

10. A construction as defined in claim 6, including an arm on the blanket or glass frame formed with notches and a slide on the other of said frames to cooperate with the notches to hold either one of said frames in open relation with respect to the supporting frame.

EDWARD L. ANDERSON.